United States Patent
Hoshiba et al.

(10) Patent No.: US 9,388,068 B2
(45) Date of Patent: Jul. 12, 2016

(54) GLASS TUBE CLEANING AND CUTTING DEVICE AND METHOD FOR SAME

(71) Applicant: NIPPON ELECTRIC GLASS CO., LTD., Otsu-shi, Shiga (JP)

(72) Inventors: Kenichi Hoshiba, Shiga (JP); Masahiro Ichikawa, Shiga (JP); Toru Hasegawa, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 234 days.

(21) Appl. No.: 14/373,480

(22) PCT Filed: Nov. 20, 2012

(86) PCT No.: PCT/JP2012/080101
§ 371 (c)(1),
(2) Date: Jul. 21, 2014

(87) PCT Pub. No.: WO2013/111443
PCT Pub. Date: Aug. 1, 2013

(65) Prior Publication Data
US 2014/0366693 A1 Dec. 18, 2014

(30) Foreign Application Priority Data

Jan. 23, 2012 (JP) ................................ 2012-010888
Jun. 27, 2012 (JP) ................................ 2012-144552

(51) Int. Cl.
*C03B 33/10* (2006.01)
*C03B 33/095* (2006.01)
*B08B 5/02* (2006.01)

(52) U.S. Cl.
CPC ............... *C03B 33/105* (2013.01); *B08B 5/023* (2013.01); *C03B 33/095* (2013.01); *Y10T 83/0443* (2015.04); *Y10T 83/242* (2015.04)

(58) Field of Classification Search
CPC ...... C03B 33/06; C03B 33/095; C03B 33/105
See application file for complete search history.

(56) References Cited

U.S. PATENT DOCUMENTS 4,226,607 A * 10/1980 Domken ................. A61J 1/065
65/105
2011/0100401 A1 5/2011 Fiorentini

FOREIGN PATENT DOCUMENTS

JP H02-87034 U 7/1990
JP H07-172852 A 7/1995

(Continued)

OTHER PUBLICATIONS

International Search Report of the corresponding International Application No. PCT/JP2012/080101, dated Feb. 13, 2013.

(Continued)

*Primary Examiner* — Lisa Herring
(74) *Attorney, Agent, or Firm* — Global IP Counselors, LLP

(57) ABSTRACT

A glass tube cleaning and cutting device and a method for same configured to cut a continuous glass tube at a predetermined length by intermittently contacting a cutting blade with the outer circumference surface of the continuously travelling continuous glass tube formed by tube pulling while blowing air to impose scratches and thermal shock on the outer circumference surface of the continuous glass tube so as to obtain a plurality of cut-off glass tubes, the glass tube cleaning and cutting device includes: a blower provided on a more downstream side of the travelling continuous glass tube than the cutting blade, the blower being configured to blow opposing air opposed to air into a tip end opening of the continuous glass tube.

13 Claims, 7 Drawing Sheets

(56) References Cited

FOREIGN PATENT DOCUMENTS

| JP | H09-067136 A | 3/1997 |
| JP | H09-132421 A | 5/1997 |
| JP | 2007-331994 A | 12/2007 |
| JP | 2011-522685 A | 8/2011 |

OTHER PUBLICATIONS

Written Opinion of the corresponding International Application No. PCT/JP2012/080101, Feb. 2013.

* cited by examiner

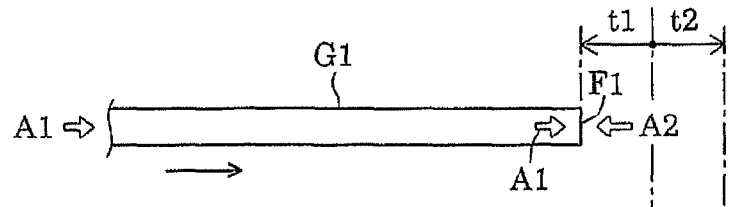
FIG. 4 (a)
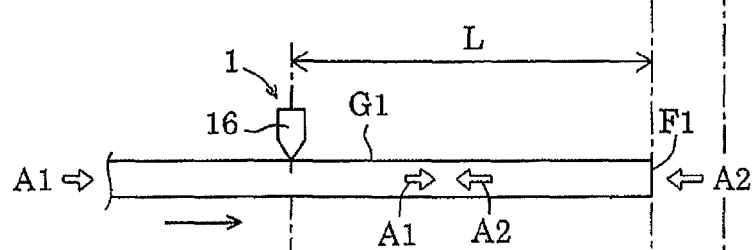
FIG. 4 (b)
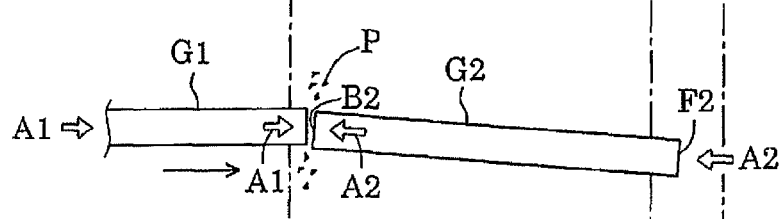
FIG. 4 (c)
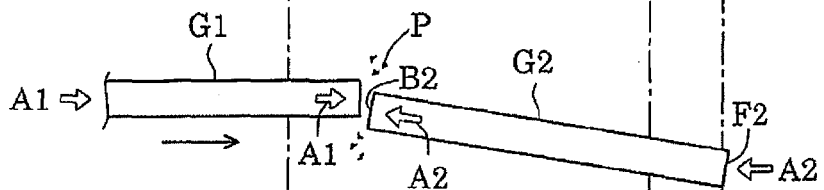
FIG. 4 (d)
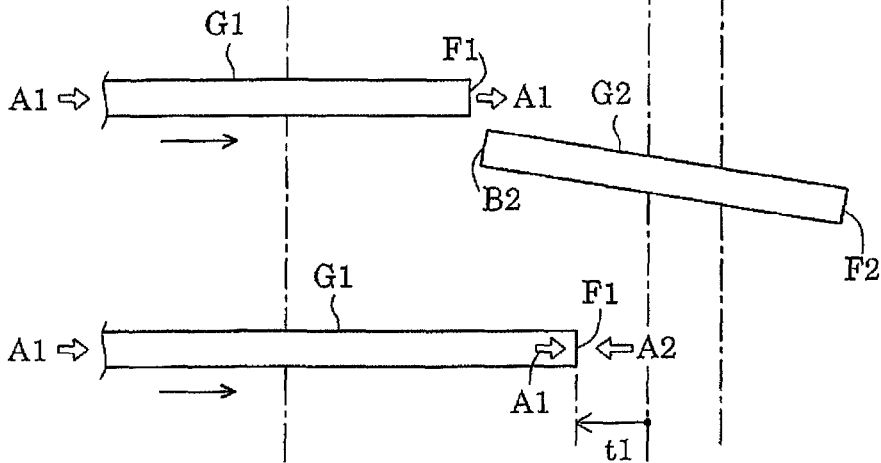
FIG. 4 (e)
FIG. 4 (f)

PRIOR ART

PRIOR ART

GLASS TUBE CLEANING AND CUTTING DEVICE AND METHOD FOR SAME

CROSS-REFERENCE TO RELATED APPLICATIONS

This U.S. National stage application claims priority under 35 U.S.C. §119(a) to Japanese Patent Applications No. 2012-010888 and 2012-144552, filed in Japan on Jan. 23, 2012 and Jun. 27, 2012 respectively, the entire contents of which are hereby incorporated herein by reference.

BACKGROUND OF THE INVENTION

1. Field of the Invention

The present invention relates to a glass tube cutting device configured to cut a continuously travelling continuous glass tube formed by tube pulling typically using the Danner method at a predetermined length and a cutting method for same.

2. Description of Related Art

Conventionally, glass tubes used for luminescent lamps, medicinal containers such as ampoules and vials, back light for liquid crystal panels are generally produced by the Danner method (For instance, see JP 07-172852 A).

As shown in FIG. 8, in a muffle furnace 100, melt glass M which flows down is wound around an outer peripheral surface of a sleeve 110 for continuously rotating to be formed into a cylindrical shape and the cylindrically-shaped melt glass is continuously drawn by a tube puller 200 disposed outside the muffle furnace 100 while blowing air A1 into an inner side of the cylindrically-shaped melt glass to form a continuous glass tube G1 by tube pulling. Subsequently, keeping the continuous glass tube G1 continuously travelling, a cutting blade 310 of a glass tube cutting device 300 is caused to be intermittently in contact with an outer peripheral surface of the continuous glass tube G1 to obtain a plurality of cut-off glass tubes G2 by cutting the continuous glass tube G1 at a predetermined length. Both ends of the plurality of cut-off glass tubes G2 are re-cut and are glazing treated while conveying the obtained cut-off glass tubes G2 by a conveyor 400 to produce a finished glass tube product.

Conventionally, devices described in JP 2007-331994 A, JP 09-067136 A, and JP-UM-02-087034 A are each known as a glass tube cutting device configured to cut a continuous glass tube that continuously travels. Such glass tube cutting devices are each configured to produce scratches by contacting a cutting blade with an outer peripheral surface of the continuous glass tube and impose thermal shock at the same time to cut the continuous glass tube.

However, conventional glass tube cutting devices were each configured to simply contact a cutting blade with a continuous glass tube, so that as shown in FIG. 9, there was a disadvantage of deterioration in purity of a cut-off glass tubes G2 because finely-crushed glass P generated at the time of cutting was blown into an inner side of a cut-off glass tube G2 from a rear end opening B2 of the cut-off glass tube G2 by air A1 coming out of a tip end opening F1 of the continuous glass tube G1, which resulted in adhesion of finely-crushed glass P to an inner surface of the glass tube. Since such a disadvantage in which finely-crushed glass P was adhered to the inner surface of the glass tube was particularly important for glass tubes used for medicinal containers such as ampoules and vials, particular careful cleansing work inside the glass tubes after cutting treatment had to be performed.

SUMMARY OF THE INVENTION

The present invention has been made in view of having the aforementioned problem with conventional glass tube cutting devices. It is an object of the present invention to provide a simple-configured glass tube cleaning and cutting device and a method for cleaning and cutting a glass tube configured to reliably prevent deterioration in purity of cut-off glass tubes caused by adhesion of finely-crushed glass to an inner surface of each cut-off glass tube.

The summary of the present invention is described as below.

In a first preferred embodiment, there is provided a glass tube cleaning and cutting device according to the present invention which comprises: a glass tube cutting device configured to cut a continuous glass tube at a predetermined length by intermittently contacting a cutting blade with an outer circumference surface of the continuously travelling continuous glass tube formed by tube pulling while blowing air to impose scratches and thermal shock on the outer circumference surface of the continuous glass tube so as to obtain a plurality of cut-off glass tubes; and a blower provided on a more downstream side of the travelling continuous glass tube than the cutting blade, the blower being configured to blow opposing air into a tip end opening of the continuous glass tube from the downstream side of the travelling continuous glass tube.

In a second preferred aspect of the glass tube cleaning and cutting device according to the present invention, the blower includes a plurality of blowing nozzles positioned where a position on a virtual vertical plane including the continuous glass tube is avoided, and air that has been injected from each of the plurality of blowing nozzles is converged on the virtual vertical plane to blow the converged air into the tip end opening of the continuous glass tube as the opposing air.

In a third preferred aspect of the glass tube cleaning and cutting device according to the present invention, a plurality of nozzle ports of the plurality of blowing nozzles are formed in a flat shape with a long axis parallel to the virtual vertical plane.

In a fourth preferred aspect of the glass tube cleaning and cutting device according to the present invention, the blower includes a plurality of blowing nozzles disposed opposite each other across a virtual horizontal plane including the continuous glass tubes, and air that has been injected from each of the plurality of blowing nozzles is converged on the virtual horizontal plane to blow the converged air into the tip end opening of the continuous glass tube as the opposing air.

In a fifth preferred aspect of the glass tube cleaning and cutting device according to the present invention, a plurality of nozzle ports of the plurality of blowing nozzles are formed in a flat shape with a long axis in a direction orthogonal to a tube axis of the continuous glass tube.

In a sixth preferred aspect of the glass tube cleaning and cutting device according to the present invention, the glass tube cleaning and cutting device further comprises a stopper provided on a more downstream side of the travelling continuous glass tube than the blower, the stopper being configured to stop a move of the plurality of cut-off glass tubes obtained from the continuous glass tube to the downstream side of the travelling continuous glass tube.

In a seventh preferred aspect of the glass tube cleaning and cutting device according to the present invention, the blower is arranged adjacent to a contact surface with tips of the cut-off glass tubes in the stopper.

In an eighth preferred aspect, there is provided a method for cleaning and cutting a glass tube which includes the steps of: cutting a continuous glass tube at a predetermined length by intermittently contacting a cutting blade with an outer circumference surface of the continuously travelling continuous glass tube formed by tube pulling while blowing air to impose scratches and thermal shock on the outer circumference surface of the continuous glass tube so as to obtain a plurality of cut-off glass tubes; and blowing opposing air into a tip end opening of the continuous glass tube from a downstream side of the travelling continuous glass tube by use of a blower provided on a more downstream side of the travelling continuous glass tube than the cutting blade to cause the opposing air to come out of respective rear end openings of the plurality of cut-off glass tubes when cutting the continuous glass tube.

In a ninth preferred aspect, the method for cleaning and cutting a glass tube according to the present invention further includes the step of blowing the opposing air into tip end openings of the cut-off glass tubes from the downstream side of the travelling continuous glass tube after cutting the continuous glass tube to cause the opposing air to come out of the rear end openings of the cut-off glass tubes.

In a tenth preferred aspect, the method for cleaning and cutting a glass tube according to the present invention further includes the step of stopping a move of the cut-off glass tubes to the downstream side of the travelling continuous glass tube by hitting tips of the cut-off glass tubes obtained from the continuous glass tube by use of a stopper provided on a more downstream side of the travelling continuous glass tube than the blower.

In an eleventh preferred aspect of the method for cleaning and cutting a glass tube according to the present invention, the step of blowing includes converging air that has been injected from a plurality of blowing nozzles disposed opposite each other across a virtual horizontal plane including the continuous glass tube at the same pressure onto the virtual horizontal plane near a contact surface of the tips of respective cut-off glass tubes in the stopper.

In a twelfth preferred aspect, the method for cleaning and cutting a glass tube according to the present invention further includes the step of intermittently blowing the opposing air.

In a thirteenth preferred aspect, the method for cleaning and cutting a glass tube according to the present invention further includes the step of making wind pressure of the opposing air coming out of the rear end openings of the cut-off glass tubes greater than wind pressure of the air coming out of the tip end opening of the continuous glass tube.

ADVANTAGES OF THE INVENTION

According to the glass tube cleaning and cutting device and the method for cleaning and cutting a glass tube of the present invention, it is possible to cause opposing air to come out of rear end openings of the cut-off glass tubes when cutting the continuous glass tube by blowing opposing air into a tip end opening of the continuous glass tube from a downstream side of the travelling continuous glass tube by use of a blower. As a result, it is possible to blow finely-crushed glass generated when cutting to the outside of the cut-off glass tubes. This makes it possible to reliably prevent finely-crushed glass from being adhered to inner surfaces of the cut-off glass tubes and deterioration in purity of the cut-off glass tubes. Even when the glass tube cleaning and cutting device includes a stopper configured to stop a move of the cut-off glass tubes obtained from the continuous glass tube to the downstream side of the travelling continuous glass tube, it is possible to obtain similar effects.

According to the glass tube cleaning and cutting device of the present invention, in which the blower has a plurality of blowing nozzles arranged where a position on the virtual vertical plane including the continuous glass tube is avoided, even when the continuous glass tube continues travelling without being cut due to cutting errors of the cutting mechanism part or the like, it is possible to avoid accidental contact with the blower, resulting in no possibility of confusion in post-processes.

According to the glass tube cleaning and cutting device of the present invention configured to converge air that has been injected from each of the plurality of blowing nozzles arranged, where a position on the virtual vertical plane is avoided, onto the virtual vertical plane and to blow the converged air into a tip end opening of the continuous glass tube as opposing air, even when the position in a travelling direction of the tip end opening of the continuous glass tube is changed, it is possible to reliably blow opposing air. Further, even when actual cutting positions of the continuous glass tube are variable, it is possible to reliably blow opposing air into the tip end openings of the cut-off glass tubes.

According to the glass tube cleaning and cutting device of the present invention, in which nozzle ports of blowing nozzles are formed in a flat shape with a long axis that is parallel to the virtual vertical plane, it is possible to inject vertically long belt-like opposing air and to reliably blow opposing air, even when the height position of the tip end opening of the continuous glass tube is changed. In addition, it is possible to reliably blow opposing air into the tip end openings of the cut-off glass tubes that fall by own weight thereof after cutting.

In the glass tube cleaning and cutting device, in which the blower includes a plurality of blowing nozzles disposed opposite each other across a virtual horizontal plane including the continuous glass tubes, it is also possible to converge air that has been injected from each of the plurality of blowing nozzles at the same pressure on the virtual horizontal plane to blow the converged air into the tip end opening of the continuous glass tube or the tip end openings of the cut-off glass tubes as opposing air. This makes it possible to avoid any accidental contact with the blower even when the continuous glass tube continues travelling without being cut due to cutting errors of the cutting mechanism part or the like, resulting in no possibility of confusion in post-processes. Further, when the stopper is provided on a more downstream side of the travelling continuous glass tube than the blower, there is no possibility of blocking opposing air from being blown into the tip end opening of the continuous glass tube or the tip end openings of the cut-off glass tubes.

According to the glass tube cleaning and cutting device, in which the nozzle ports of respective blowing nozzles are formed in a flat shape having a long axis in a direction orthogonal to a tube axis of the continuous glass tube, it is possible to inject opposing air, in which desired wind pressure is sufficiently secured, in a horizontally long belt-like shape. This makes it possible to reliably blow opposing air even when the position of the tip end opening of the continuous glass tube in a travelling direction is changed. In addition, even when the positions of the tip end openings of the cut-off glass tubes are shifted a little in the left and right relative to the travelling direction of the continuous glass tube after cutting, it is possible to reliably blow opposing air.

According to the glass tube cleaning and cutting device, in which the blower is arranged adjacent to a contact surface with tips of the cut-off glass tubes in a stopper, there is little dead space where it becomes possible to blow opposing air into tip end openings of respective cut-off glass tubes until the tip of each cut-off glass tube hits the contact surface in the stopper. As a result, it becomes possible to keep blowing opposing air until shortly before a move of each of the cut-off glass tubes to a downstream side of the travelling continuous glass tube is stopped by the stopper, which leads to reliably blow off finely-crushed glass to the outside of the cut-off glass tubes.

According to a method for cleaning and cutting a glass tube, in which opposing air is blown into the tip end openings of respective cut-off glass tubes after the continuous glass tube is cut, it is possible to more reliably blow off finely-crushed glass to the outside of respective cut-off glass tubes.

According to the method for cleaning and cutting a glass tube, in which opposing air is intermittently blown, it is reliably possible to secure time to cause air to come out of the tip end opening of the continuous glass tube alone by stopping the blowing of opposing air using a blower. Consequently, even when finely-crushed glass is blown into the inside of the continuous glass tube by the blowout of opposing air from the rear end openings of the cut-off glass tubes, it is possible to blow off finely-crushed glass to the outside of the continuous glass tube by the blowout of air. This makes it possible to reliable secure purity of the tip end opening of the continuous glass tube, resulting in maintaining purity of the tip end openings of the cut-off glass tubes.

According to the method for cleaning and cutting a glass tube to make wind pressure of opposing air coming out of the rear end openings of the cut-off glass tubes greater than wind pressure of air coming out of the tip end opening of the continuous glass tube, it is possible to reliably cause opposing air to come out of the rear end openings of the cut-off glass tubes even when the wind pressure of air coming out of the continuous glass tubes is a little variable.

BRIEF DESCRIPTION OF THE DRAWINGS

FIGS. 4 (a) to 4 (f) are each a schematic side view of an important part illustrating a cleaning and cutting process for a glass tube cleaning and cutting device in this embodiment of the present invention;

DESCRIPTION OF THE PREFERRED
EMBODIMENTS

Figure 1:
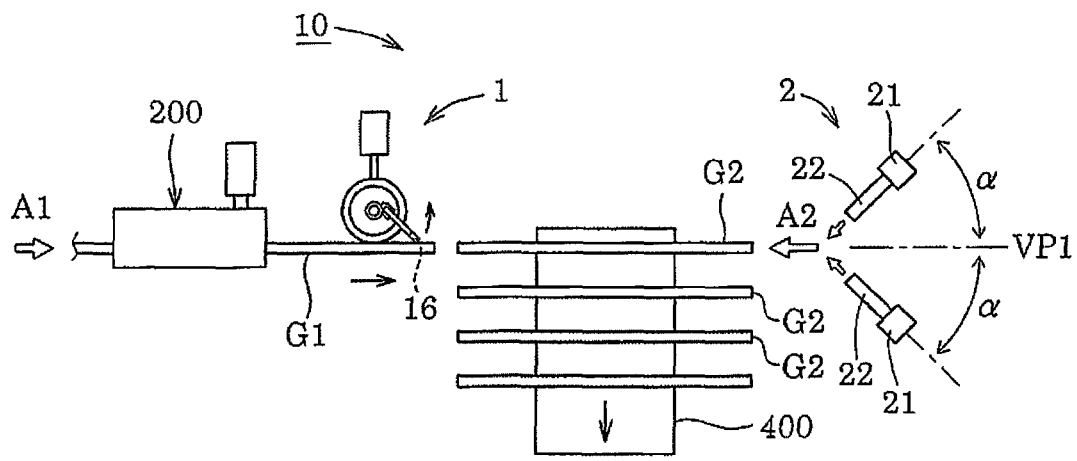
FIG. 1 is a schematic plan view of a glass tube cleaning and cutting device in an embodiment of the present invention.

As shown in FIG. 1, a glass tube cleaning and cutting device 10 of an embodiment of the present invention comprises: a cutting mechanism part 1 configured to cut a continuous glass tube G1 at a predetermined length that is formed by tube pulling while blowing air A1 to continuously travels; and a blower 2 configured to blow opposing air A2 opposed to air A1 into inside the continuous glass tube G1 or inside each cut-off glass tube G2. The glass tube cleaning and cutting device 10 is disposed on a more downstream side of the travelling continuous glass tube G1 (hereinafter referred to simply as "a downstream side of a travelling continuous glass tube") than a publicly known tube puller 200 to pull the continuous glass tube G1 and cleanly cut the continuous glass tube G1 that continuously travels at each predetermined length. And a plurality of cut-off glass tubes G2 obtained by cutting are each conveyed to a next step by a publicly known conveyor 400.

Further, the glass tube cleaning and cutting device 10 of this embodiment of the present invention may be applied to a cutting treatment of a continuous glass tube formed by tube pulling while air is blown typically using the down load method, the up-draw method or the like in addition to be applied to cutting treatment of the continuous glass tube formed by tube pulling while air is blown using the Danner method.

Figure 2:
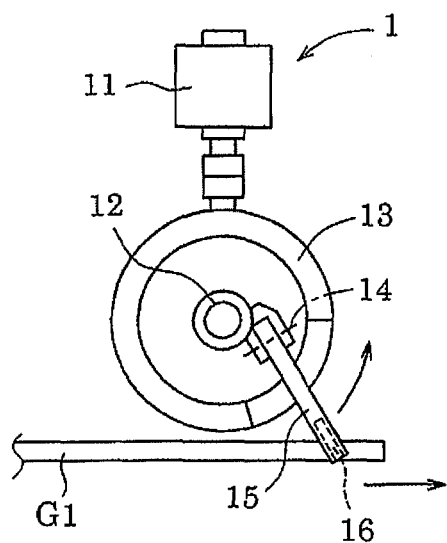
FIG. 2 is a plan view of a cutting mechanism part in a glass tube cleaning and cutting device in this embodiment of the present invention.

As shown in FIG. 2, the cutting mechanism part 1 of the glass tube cleaning and cutting device 10 comprises: a vertical rotating axis 12 driven by a motor 11 via a bevel gear not shown; an arm 15 attached to the rotating axis 12, the arm 15 moving up and down on an axis 14 in accordance with a cam 13 while continuously rotating in a substantially horizontal plane; and a cutting blade 16 fixed to a lower part of a tip of the arm 15, the cutting blade 16 being supplied with a proper amount of moisture through a supply path not shown.

Scratches and thermal shock are imposed at the same time at the top of an outer circumference surface of the continuous glass tube G1 by continuously rotating the arm 15 of the cutting mechanism part 1 in synchronization with travel of the continuous glass tube G1 for continuously travelling in a horizontal direction and intermittently contacting the cutting blade 16 with an upper part of the outer circumference surface of the continuous glass tube G1. And cracks originated from the scratches are caused on the outer circumference surface of the continuous glass tube G1 by this thermal shock and operating bending moment by self weight of the continuous glass tube G1 to cut the continuous glass tube at a predetermined length.

Figure 3:
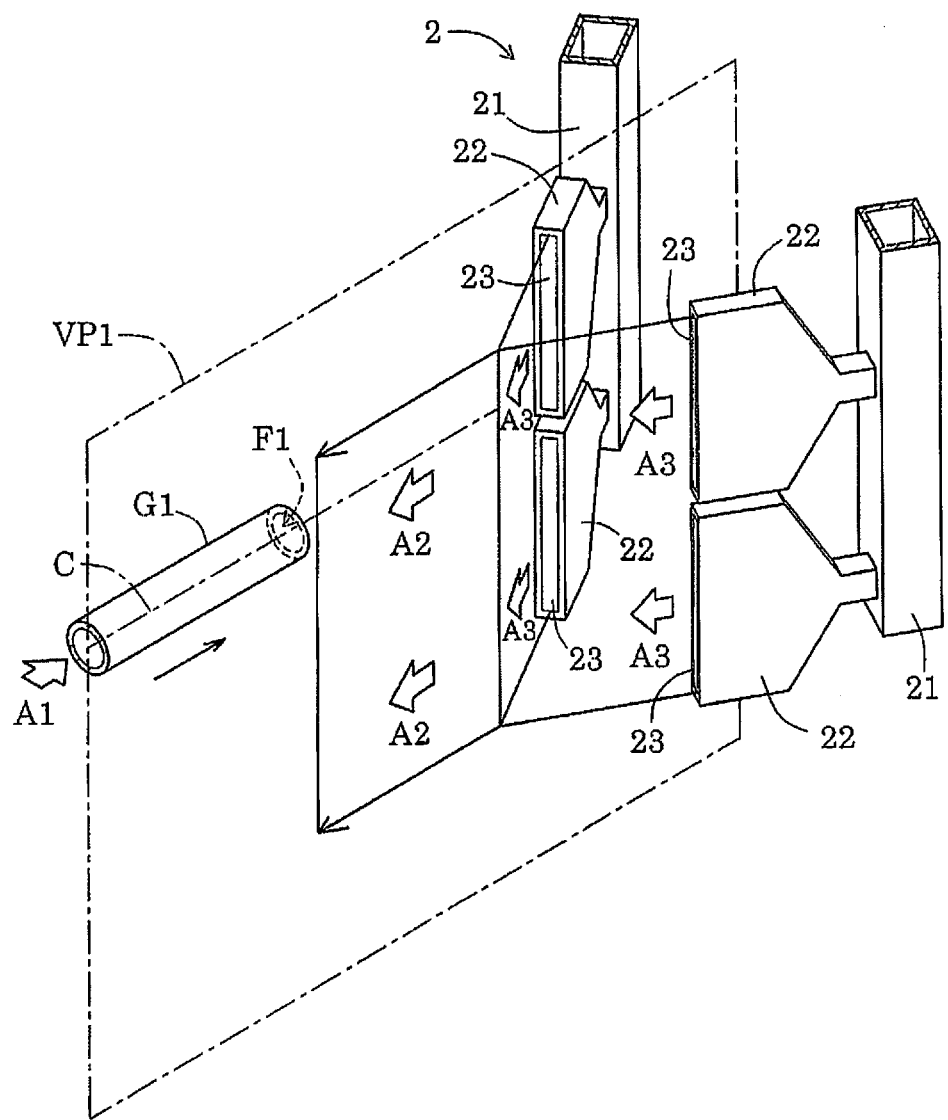
FIG. 3 is a perspective view of a blower in a glass tube cleaning and cutting device in this embodiment of the present invention.

As shown in FIG. 1, the blower 2 is provided on a more downstream side of the travelling continuous glass tube than the cutting blade 16 of the aforementioned cutting mechanism part 1. As shown in FIG. 3, the blower 2 of this embodiment of the present invention includes a plurality of blowing nozzles 22 each fixed to a pair of supports 21 and pure air supplied from a supply source not shown is injected from respective blowing nozzles 22.

In this embodiment of the present invention, total four blowing nozzles 22, which are two pairs of blowing nozzles 22 are disposed where a position on a virtual vertical plane VP1 including a central axis C of the continuous glass tube G1 is avoided. Air A3 that has been injected from each of the blowing nozzles 22 is once converged on the virtual vertical plane VP1 to blow the converged air into a tip end opening F1 of the continuous glass tube G1 as opposing air A2. As shown in FIG. 1, in this embodiment of the present invention, while the blowing nozzles 22 on both sides of left and right across the virtual vertical plane VP1 are disposed in a position plane-symmetrical to the virtual vertical plane VP1 and air angles α relative to the virtual vertical plane VP1 of respective blowing nozzles 22 are identical, the arrangement position and the air angle of respective blowing nozzles 22 may be appropriately adjusted, if necessary.

As shown in FIG. 3, in this embodiment of the present invention, a plurality of nozzle ports 23 of respective blowing nozzles 22 are formed in a flat shape having a long axis parallel to the virtual vertical plane VP1. This makes it possible to inject vertically long belt-like air A3 and then inject vertically long belt-like opposing air A2 into a tip end opening F1 of the continuous glass tube G1.

Referring to FIGS. 4 (a) to 4 (f), a method for cleaning and cutting a glass tube G1 by the glass tube cleaning and cutting device 10 being an embodiment of the present invention will now be described in detail.

A glass tube cleaning and cutting device 10 being an embodiment of the present invention operates a cutting mechanism part 1 thereof during continuous travel of a continuous glass tube G1 to intermittently contact a cutting blade 16 with an outer circumference surface of the continuous glass tube G1 and therefore, the continuous glass tube G1 is cut at each predetermined length. That is, as shown in FIG. 4 (b), when a tip end opening F1 of a continuous glass tube G1 passes through the cutting mechanism part 1 by a predetermined length L, the cutting blade 16 is caused to come into contact with an outer circumference surface of the continuous glass tube G1 and scratches and thermal shock are imposed on the outer circumference surface of the continuous glass tube G1 to cut the continuous glass tube G1 at each predetermined length L as shown in FIGS. 4 (c) to 4 (e).

In the glass tube cleaning and cutting device 10 being an embodiment of the present invention, opposing air A2 is intermittently blown into a tip end opening F1 or a tip end opening F2 of a cut-off glass tube G2 at a certain timing by intermittently operating a blower 2 during continuous travelling of the continuous glass tube G1. This makes it possible to prevent finely-crushed glass P from being adhered to an inner surface of the cut-off glass tube G2.

As shown in FIG. 4 (a), the blower 2 starts blowing opposing air A2 before the time when the tip end opening F1 of the continuous glass tube G1 passes through the cutting mechanism part 1 by the predetermined length L. As shown in FIG. 4 (b), when the cutting blade 16 is caused to contact with the continuous glass tube G1, opposing air A2 is caused to be opposed to air A1 inside the tube of the continuous glass tube G1. As shown in FIG. 4 (c), when the continuous glass tube G1 is cut, opposing air A2 is caused to come out of a rear end opening B2 of the cut-off glass tube G2. In this way, finely-crushed glass P generated at the time of cutting is blown off to the outside of the cut-off glass tube G2 to prevent finely-crushed glass P from being adhered to the inner surface of the cut-off glass tube G2.

In this embodiment of the present invention, blow-in of opposing air A2 starts at the timing earlier than the time when the tip end opening F1 of the continuous glass tube G1 passes through the cutting mechanism part 1 by a predetermined length L by t1 (=0.2T) which is 20% of time T for the continuous glass tube G1 to travel by the predetermined length L. However, the starting timing of the blowing of opposing air A2 may be appropriately adjusted in view of the distance among the blowing nozzles 22 and the tip end opening F1 of the continuous glass tube G1, the cut-off length and the inner diameter of the cut-off glass tube G2, and the wind pressure of air A1 that comes out of the continuous glass tube G1 or the like.

In this embodiment of the present invention, the wind pressure of opposing air A2 which is caused to come out of the rear end opening B2 of the cut-off glass tube G2 is greater than the wind pressure of air A1 which comes out of the tip end opening of the continuous glass tube G1 when cutting the continuous glass tube G1 (See FIG. 4 (c)). This makes it possible to reliably cause opposing air A2 to come out of the rear end opening B2 of the cut-off glass tube G2, even when the wind pressure of air A1 which comes out of the continuous glass tube G1 is a little variable. In addition, the wind pressure of blowing out opposing air A2 at the time of cutting may be the same as the wind pressure of blowing out of air A1 and may be appropriately adjusted in view of the wind pressure of air A1 that comes out of the continuous glass tube G1. However, when the wind pressure of opposing air A2 that is caused to come out of the rear end opening B2 of the cut-off glass tube G2 is unnecessarily greater than the wind pressure of air A1 that comes out of the tip end opening of the continuous glass tube G1, as a result of blocking of blowing air A1, formation of the continuous glass tube G1 by tube pulling is badly affected, which is not preferable.

As shown in FIGS. 4 (c) and 4 (d), even after cutting the continuous glass tube G1, the blower 2 continues injecting opposing air A2 and blows opposing air A2 from a downstream side of the travelling cut-off glass tube to the tip end opening F2 of the cut-off glass tube G2 to cause opposing air A2 to come out of the rear end opening B2 of the cut-off glass tube G2. This makes it possible to reliably blow off finely-crushed glass P to the outside of the cut-off glass tube G2.

The blower 2 finishes blowing opposing air A2 at the timing later than the time when the tip end opening F1 of the continuous glass tube G1 before cutting passes through the cutting mechanism part 1 by a predetermined length L (See FIG. 4 (b)) by t2 (=0.2T) which is 20% of time T for the continuous glass tube G1 to travel by the predetermined length L. The timing when the blowing of opposing air A2 is finished may be appropriately adjusted, if necessary.

As shown in FIG. 4 (e), no opposing air A2 comes out of the rear end opening B2 of the cut-off glass tube G2 while the blower 2 stops blowing of opposing air A2 and air A1 only comes out of the tip end opening F1 of the continuous glass tube G1. Accordingly, at the point of FIGS. 4 (c) and (d), even when finely-crushed glass P is blown inside the tube of the continuous glass tube G1 by blowing out opposing air A2 from the rear end opening B2 of the cut-off glass tube G2, it is possible to blow off finely-crushed glass P to the outside of the continuous glass tube G1 by the blowout of air A1. This makes it possible to securely maintain purity of the tip end opening F1 of the continuous glass tube G1 and the tip end opening F2 of the cut-off glass tube G2.

Subsequently, as shown in FIG. 4 (f), the blower 2 starts again blowing opposing air A2 at the timing earlier than the time when the tip end opening F1 of the continuous glass tube G1 passes through the cutting mechanism part 1 by a predetermined length L by the aforementioned time t1 (=0.2T). In this way, purifying and cutting treatment on the continuous glass tube G1 that continuously travels is repeated to obtain a plurality of cut-off glass tubes G2 each having a clean cutting part.

As mentioned above, the glass tube cleaning and cutting device 10 in this embodiment of the present invention is capable of blowing opposing air A2 from the downstream side of a traveling direction into the tip end opening F1 of the continuous glass tube G1 by use of the blower 2 to cause opposing air A2 to come out of the rear end opening B2 of the cut-off glass tube G2 when cutting the continuous glass tube G2. As a result, it is possible to blow off finely-crushed glass P generated at the time of cutting to the outside of the cut-off glass tube G2. This makes it possible to reliably prevent finely-crushed glass P from being adhered to the inner surface of the cut-off glass tube G2, resulting in prevention of deterioration in purity of the cut-off glass tube G2.

In the glass tube cleaning and cutting device 10 being an embodiment of the present invention, the blower 2 includes a plurality of blowing nozzles 22 disposed in positions where on the virtual vertical plane VP1 including the continuous glass tube G1 is excluded. Accordingly, it is possible to avoid accidental contact with the blower 2 even when the continuous glass tube G1 continues travelling without being cut due to cutting errors of the cutting mechanism part 1 and the like, resulting in no possibility of confusion in post-processes.

In addition, in this embodiment of the present invention, it is possible to converge Air A3 that has been injected from each of the blowing nozzles 22, where a position on the virtual vertical plane VP1 is avoided, onto the virtual vertical plane VP1 to blow the converged air into a tip end opening F1 of the continuous glass tube G1 as opposing air A2. Accordingly, it is possible to reliably blow opposing air A2 even when the position in a traveling direction of the tip end opening F1 of the continuous glass tube G1 is changed. Moreover, even when the actual cutting positions of the continuous glass tube G1 are not uniform, it is possible to reliably blow opposing air A2 into a tip end openings F2 of each cut-off glass tube G2.

In this embodiment of the present invention, the plurality of nozzle ports 23 of respective blowing nozzles 22 are formed in a flat shape having a long axis parallel to the virtual vertical plane VP1 to inject vertically long belt-like opposing air A2. This makes it possible to reliably blow opposing air A2 even when the height position of the tip end opening F1 of the continuous glass tube G1 is changed. After cutting, it is possible to reliably blow opposing air A2 into the tip end opening F2 of the cut-off glass tube G2 that falls by own weight thereof.

While the glass tube cleaning and cutting device and the method for same in this embodiment of the present invention have thus been described so far, it is to be understood that the present invention may be carried out in other forms.

For instance, in the aforementioned embodiment, as shown in FIG. 3, while two blowing nozzles 22 having vertically long blowing ports 23 parallel to the virtual vertical plane VP1 are arranged in a vertical direction in the blower 2, three or more vertically long blowing nozzles 22 may be arranged in a vertical direction. Alternatively, vertically long belt-like air may be injected by only one blowing nozzle 22. In addition, a large number of blowing nozzles each having a circle-shaped nozzle port may be arranged in a vertical direction to inject vertically long belt-like air.

Blowing nozzles each having a vertically long nozzle port parallel to the virtual vertical plane VP1 may be disposed in an upward position of the continuous glass tube G1 on the virtual vertical plane VP1 so as to blow opposing air into the tip end opening F1 of the continuous glass tube G1 from obliquely upward.

Figure 5:
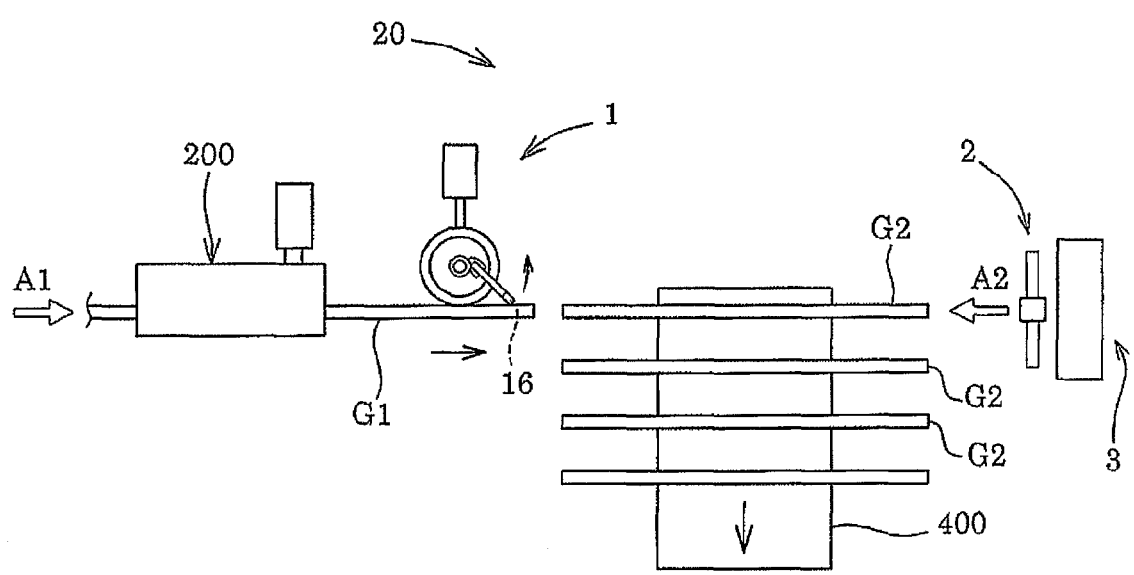
FIG. 5 is a schematic plan view of a glass tube cleaning and cutting device in another embodiment of the present invention.

Alternatively, like a glass tube cleaning and cutting device 20 shown in FIG. 5, another embodiment may also be carried out in a form in which a glass tube cleaning and cutting device 20 includes a stopper 3 configured to stop cut-off glass tubes G2 obtained after cutting from moving to a downstream side of the travelling continuous glass tube G1 in addition to a cutting mechanism part 1 and a blower 2. Additionally, detailed explanation of the cutting mechanism part 1 is omitted because the cutting mechanism part 1 has a configuration similar to that of the aforementioned glass tube cleaning and cutting device 10.

Figure 6:
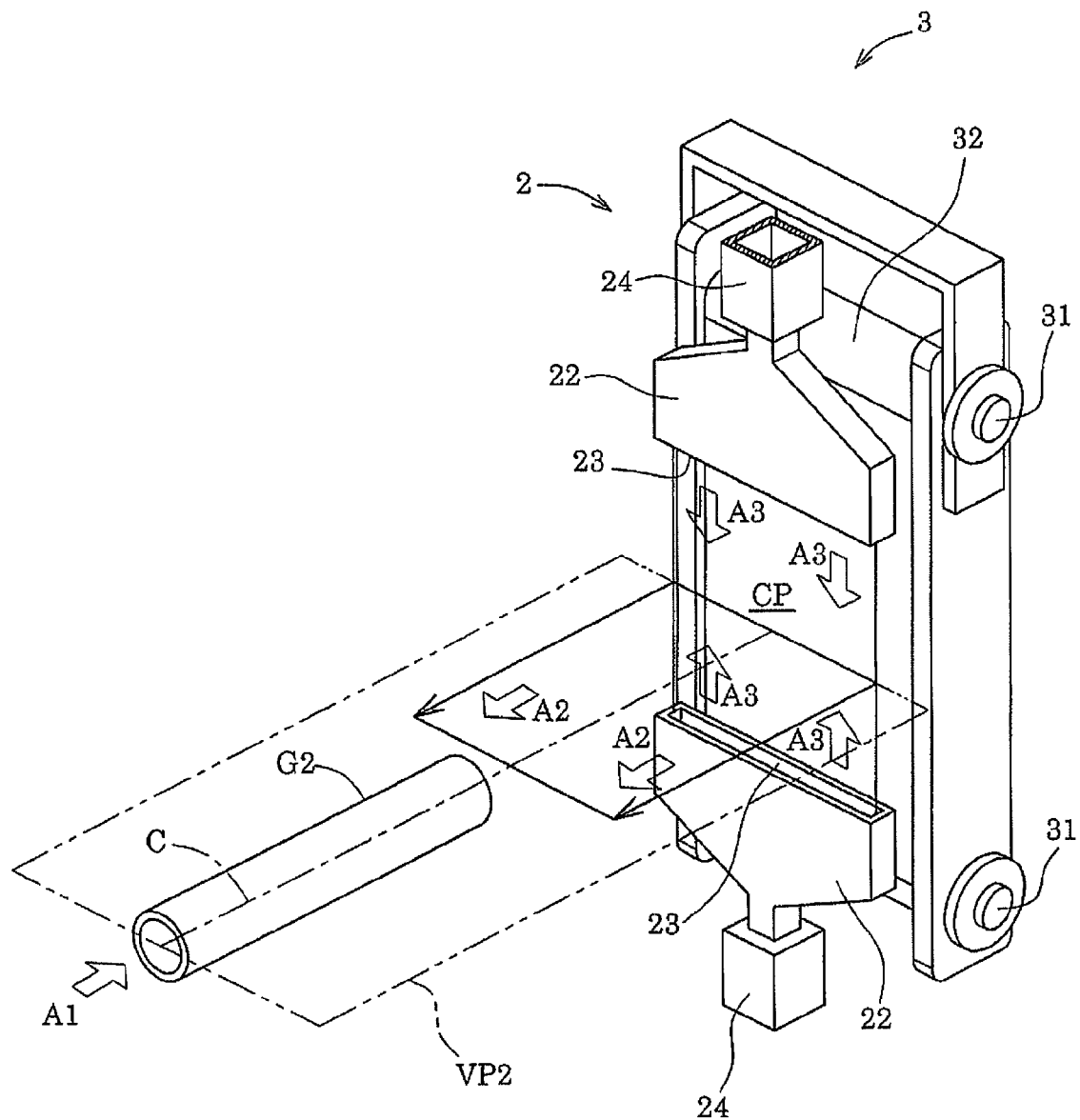
FIG. 6 is a perspective view of a blower and a stopper in a glass tube cleaning and cutting device in another embodiment of the present invention.

As shown in FIG. 5, the blower 2 is provided on a more downstream side of the travelling continuous glass tube than a cutting blade 16 of the aforementioned cutting mechanism part 1. As shown in FIG. 6, the blower 2 in this embodiment of the present invention includes a plurality of blowing nozzles 22 each fixed to a pair of supply air pipes 24 and injects purified air supplied from a supply source not shown through the pair of supply air pipes 24 from respective blowing nozzles 22.

In another embodiment of the present invention, a pair of blowing nozzles 22 are disposed opposite each other across a virtual horizontal plane VP2 including a central axis C of the continuous glass tube G1 and are so configured that air A3 having injected from each of the blowing nozzles 22 is once converged on the virtual horizontal plane VP2 to blow the converged air into a tip end opening F1 of the continuous glass tube G1 as opposing air A2. More specifically, the converged air is bent in a direction orthogonal to an injection direction of respective air A3 by converging air A3 that has been injected at the same pressure from respective blowing nozzles 22 having a plurality of nozzle ports 23 face to each other disposed in a plane-symmetrical position relative to the virtual horizontal plane VP2. In this embodiment of the present invention, converged air bent to an upstream side of the travelling continuous glass tube G1 out of such converged air is blown into the tip end opening F1 of the continuous glass tube G1 as opposing air A2.

Figure 7:
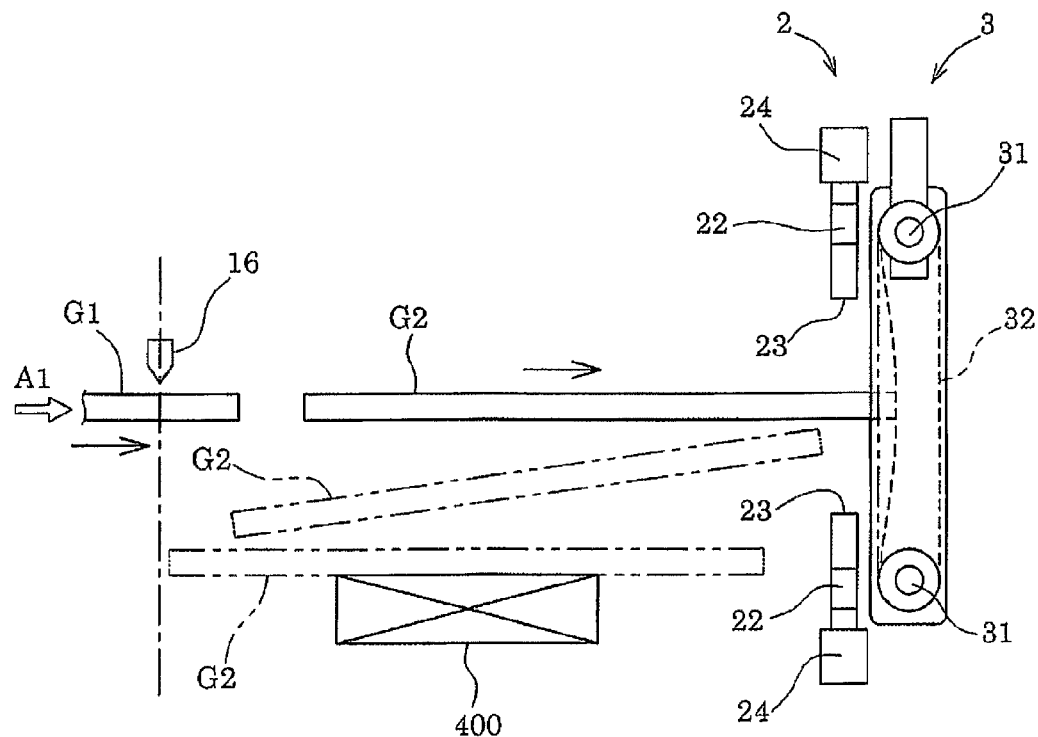
FIG. 7 is a side view of a blower and a stopper in a glass tube cleaning and cutting device in another embodiment of the present invention.
Figure 8:
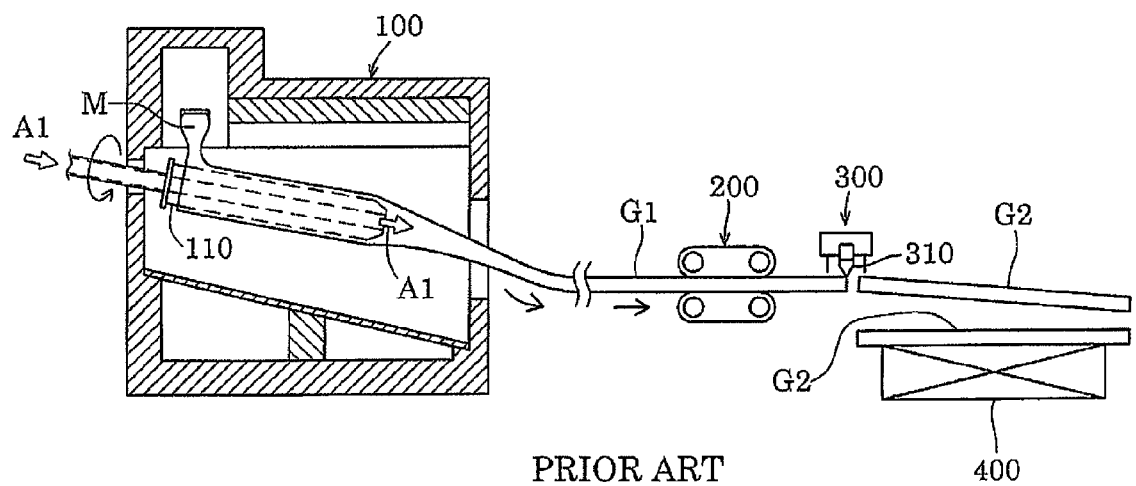
FIG. 8 is a schematic side view indicating a production process of conventional cut-off glass tubes.
Figure 9:
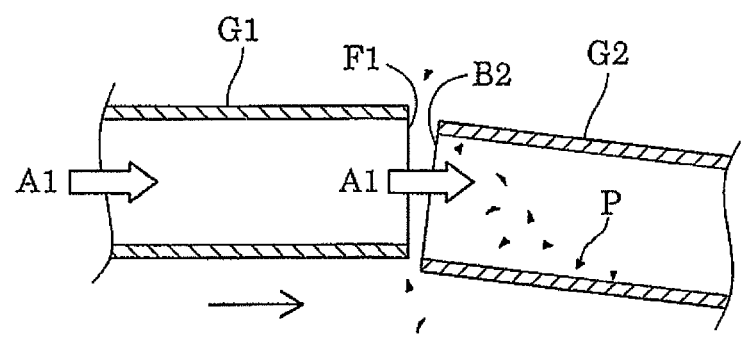
FIG. 9 is a cross-sectional view of an important part illustrating a state in which finely-crushed glass is adhered to an inner surface of cut-off glass tubes in a cutting process of conventional continuous glass tubes.

In another embodiment of the present invention, as shown in FIGS. 6 and 7, respective blowing nozzles 22 are arranged adjacent to a contact surface CP with a tip end of the cut-off glass tube G2 in a stopper 3 to be described later. This makes it possible to avoid the formation of dead space, where it is impossible to blow opposing air A2 into the tip end opening F2 of the cut-off glass tube G2, in a space until a tip end of the cut-off glass tube G2 hits the contact surface CP in the stopper 3.

In another embodiment of the present invention, as shown in FIG. 6, the plurality of nozzle ports 23 of respective blowing nozzles 22 are formed in a flat shape having a long axis in a direction orthogonal to a tube axis (central axis C) of the continuous glass tube G1. This makes it possible to inject horizontally long belt-like air A3 that has been injected from respective blowing nozzles 22 into the tip end opening F1 of the continuous glass tube G1 as horizontally long belt-like opposing air A2 in addition to keep converged air which is bent in a direction orthogonal to the tube axis (central axis C) of the continuous glass tube G1 to the minimum.

The stopper 3 is configured to stop the cut-off glass tube G2 automatically moving to a downstream side of the travelling continuous glass tube after cutting and is provided on a more downstream side of the travelling continuous glass tube than the blower 2 as shown in FIG. 5. As shown in FIG. 6, the stopper 3 of this embodiment in the present invention includes an endless heat-resistant belt 32 wound around a pair of rollers 31 disposed opposite each other across the virtual horizontal plane VP2. And one surface on which side is oppositely face to respective blowing nozzles 22 of the heat-resistant belt 32 forms a contact surface CP with a tip of the cut-off glass tube G2. In another embodiment of the present invention, the heat-resistant belt 32 is composed of a heat-resistant material such as Kevlar (Registered Trademark), which is made of a felt member formed with a width substantially the same as the long axis of each nozzle port 23 of each blowing nozzle 22.

In another embodiment of the present invention, the heat-resistant belt 32 of the stopper 3 is rotatably wound around a pair of rollers 31 while keeping constant tension. As shown in FIG. 7, this makes it possible to appropriately modify the position of a portion concentrically damaged by repeatedly hitting the high-temperature cut-off glass tube G2 in addition to drop the cut-off glass tube G2 on a conveyor 400 by slightly pushing back the cut-off glass tube G2 to an upstream side of the travelling continuous glass tube G1 while buffering impact generated when the tip of the cut-off glass tube G2 hits the center of the contact surface CP.

Next, a method for cleaning and cutting a continuous glass tube G1 using the glass tube cleaning and cutting device 20 being another embodiment of the present invention will now be described in detail. The method for cleaning and cutting the continuous glass tube G1 using the glass tube cleaning and cutting device 20 in another embodiment of the present invention is common to the method for cleaning and cutting the continuous glass tube G1 using the aforementioned glass tube cleaning and cutting device 10 (FIGS. 4 (a) to 4 (f)) except for the points mentioned below. Accordingly, items that differ from the aforementioned method for cleaning and cutting the continuous glass tube G1 using the glass tube cleaning and cutting device 10 will now be mainly described in detail.

In another embodiment of the glass tube cleaning and cutting device 20 of the present invention, in the same manner as mentioned above, opposing air A2 is intermittently blown into the tip end opening F1 of the continuous glass tube G1 or the tip end opening F2 of the cut-off glass tube G2 at a predetermined timing by intermittently operating the blower 2 while the continuous glass tube G1 is continuously travelling (FIGS. 4 (a) to 4 (b)). In another embodiment of the present invention, converged air formed by converging air A3 that has been injected from a pair of blowing nozzles 22 disposed opposite each other across the virtual horizontal plane VP2 at the same pressure on the virtual horizontal plane VP2 near the contact surface CP in the stopper 3 is blown. The converged air is blown as opposing air A2. This prevents finely-crushed glass P from being adhered to an inner surface of the cut-off glass tube G2.

In another embodiment of the present invention, as shown in FIG. 6, air A3 coming out of each of the blowing nozzles 22 is converged on the virtual horizontal plane VP2 near the contact surface CP of the heat-resistant belt 32 to blow converged air bent in a direction orthogonal to injection directions of respective air A3 as opposing air A2. This makes it possible to keep blowing opposing air A2 immediately before a tip of the cut-off glass tube G2 that automatically continues moving to the downstream side of the travelling continuous glass tube hits the contact surface CP of the heat-resistant belt 32 in the stopper 3, which leads to more reliably blow off finely-crushed glass P to the outside of the cut-off glass tube G2.

In another embodiment of the present invention, at the timing when the blowing of opposing air A2 has been finished or the timing immediately before that, the tip of the cut-off glass tube G2 is caused to hit the contact surface CP of the heat-resistant belt 32 to stop a move of the cut-off glass tube G2 to the downstream side of the travelling continuous glass tube G1. This makes it possible to prevent finely-crushed glass P that may be generated when hitting the heat-resistant belt 32 of the stopper 3 from being blown inside the cut-off glass tube G2 by opposing air A2.

Like the above-mentioned glass tube cleaning and cutting device 10, it is possible for the glass tube cleaning and cutting device 20 being another embodiment of the present invention to cause opposing air A2 to come out of the rear end opening B2 of the cut-off glass tube G2 when cutting the continuous glass tube G1 by blowing opposing air A2 into the tip end opening F1 of the continuous glass tube G1 from the downstream side of the travelling continuous glass tube by the blower 2. As a result, it is possible to blow off finely-crushed glass P generated when cutting to the outside of the cut-off glass tube G2. This reliably prevents finely-crushed glass P from being adhered to the inner surface of the cut-off glass tube G2 and prevents deterioration in purity of the cut-off glass tube G2.

In the glass tube cleaning and cutting device 20 being an embodiment of the present invention, since the blower 2 includes a plurality of blowing nozzles 22 disposed opposite each other across the virtual horizontal plane VP2 including the continuous glass tube G1, it is possible to converge air A3 that has been injected from respective blowing nozzles 22 at the same pressure on the virtual horizontal plane VP2 to blow the converged air into the tip end opening F1 of the continuous glass tube G1 as opposing air A2. Accordingly, even when the continuous glass tube G1 continues travelling without being cut due to cutting errors of the cutting mechanism part 1, there is no possibility of confusion in post-processes because it is possible to avoid accidental contact with the blower 2. Simultaneously, there is no possibility that opposing air A2 may be blocked from being blown into the tip end opening F1 of the continuous glass tube G1 or the tip end opening F2 of the cut-off glass tube G2 by the presence of the stopper 3 disposed on a more downstream side of the travelling continuous glass tube than the blower 2.

Additionally, in this embodiment of the present invention, respective blowing nozzles 22 are disposed adjacent to the contact surface CP with a tip of each cut-off glass tube G2 in the stopper 3, so that there is little dead space where it becomes impossible to blow opposing air A2 into the tip end opening F2 of each cut-off glass tube G2 until a tip of each cut-off glass tube G2 hits the contact surface CP in the stopper 3. As a result, it becomes possible to keep blowing opposing air A2 until shortly before a move of the cut-off glass tube G2 to the downstream side of the travelling continuous glass tube is stopped by the stopper 3, which leads to reliably blow off of finely-crushed glass P to the outside of the cut-off glass tube G2.

In this embodiment of the present invention, since the nozzle ports 23 of respective blowing nozzles 22 are formed in a flat shape having a long axis in a direction orthogonal to the tube axis (central axis C) of the continuous glass tube G1, it is possible to inject opposing air A2 in which desired wind pressure is sufficiently secured in a horizontally long belt-like shape. This makes it possible to reliably blow opposing air A2 even when the position of the tip end opening F1 of the continuous glass tube G1 in a travelling direction is changed. In addition, even when the positions of the tip end openings F2 of the cut-off glass tubes G2 are shifted a little in the left and right relative to the travelling direction of the continuous glass tube G1 after cutting, it is possible to reliably blow opposing air A2.

In the aforementioned glass tube cleaning and cutting device 20 and the method for same using the glass tube cleaning and cutting device 20, while opposing air A2 is caused to intermittently blow into a tip end opening F1 or a tip end opening F2 of each cut-off glass tube G2 at a certain timing by intermittently operating the blower 2, the blower 2 may be caused to continuously operate. Even when the blower 2 is caused to continuously operate, converged air A3 that has been injected from respective blowing nozzles 22 is instantly blocked when the tips of the cut-off glass tubes G2 hit the heat-resistant belt 32 of the stopper 3. Accordingly, opposing air A2 is caused to blow substantially intermittently. In this case, there is an advantage that no complicated motion control of the blower 2 in accordance with the travel speed or the like of the continuous glass tube G1 is needed.

The glass tube cleaning and cutting device of the present invention, indication thereof in figures is omitted, may be practiced in a form that the aforementioned glass tube cleaning and cutting device 10 further includes a stopper 3. Alternatively, in the aforementioned glass tube cleaning and cutting device 20, an embodiment may be possible in a form without stopper 3. In this way, the present invention may be practiced by a combination of respective component requirements of the glass tube cleaning and cutting device in accordance with various conditions such as the travel speed of the continuous glass tube G1 (cut-off glass tubes G2) formed by tube pulling, the size of the diameter and the thickness of the continuous glass tube G1 in a production process.

It is to be understood that the present invention may be embodied in several forms in which any and all improvements, modifications, and variations may be added based on the knowledge of those skilled in the art without departing from the spirit of the present invention. And the present invention may be embodied in the forms in which any matters to define the invention are replaced by other art within the scope in which identical operation or effects are created. In addition, the invention may be embodied in the forms in which matters to define the invention integrally formed are composed of a plurality of members or matters to define the invention composed of a plurality of members are integrally formed.

What is claimed is:

1. A glass tube cleaning and cutting system, comprising:
    a glass tube cutting device configured to intermittently contact a cutting blade with an outer circumference surface of a travelling continuous glass tube formed by tube pulling while blowing air to impose scratches and thermal shock on the outer circumference surface of the travelling continuous glass tube to cut the travelling continuous glass tube so as to obtain a plurality of cut-off glass tubes; and
    a blower provided more downstream of the travelling continuous glass tube than the cutting blade, the blower being configured to blow opposing air into a tip end opening of the travelling continuous glass tube from the downstream location.

2. The glass tube cleaning and cutting system according to claim 1, wherein
    the blower includes a plurality of blowing nozzles positioned to avoid a position on a virtual vertical plane including the travelling continuous glass tube, the plurality of blowing nozzles being configured such that air that is emitted from each of the plurality of blowing nozzles converges on the virtual vertical plane and enters into the tip end opening of the travelling continuous glass tube as the opposing air.

3. The glass tube cleaning and cutting system according to claim 2, wherein
    a plurality of nozzle ports of the plurality of blowing nozzles are each formed in a flat shape with a respective long axis parallel to the virtual vertical plane.

4. The glass tube cleaning and cutting system according to claim 1, wherein
    the blower includes a plurality of blowing nozzles disposed opposite each other across a virtual horizontal plane including the travelling continuous glass tube; and
    air that is emitted from each of the plurality of blowing nozzles converges on the virtual horizontal plane to enter into the tip end opening of the travelling continuous glass tube as the opposing air.

5. The glass tube cleaning and cutting system according to claim 4, wherein
    a plurality of nozzle ports of the plurality of blowing nozzles are each formed in a flat shape with a respective long axis in a direction orthogonal to a tube axis of the travelling continuous glass tube.

6. The glass tube cleaning and cutting system according to claim 1, further comprising:
    a stopper provided more downstream of the travelling continuous glass tube than the blower, the stopper being configured to stop the plurality of cut-off glass tubes obtained from the travelling continuous glass tube from moving further downstream of the travelling continuous glass tube.

7. The glass tube cleaning and cutting system according to claim 6, wherein the blower is arranged adjacent to a contact surface of the stopper that is arranged to contact tips of the cut-off glass tubes.

8. A method for cleaning and cutting a glass tube, comprising:
    cutting a travelling continuous glass tube formed by tube pulling while blowing air by intermittently contacting a cutting blade with an outer circumference surface of the travelling continuous glass tube to impose scratches and thermal shock on the outer circumference surface of the travelling continuous glass tube to obtain a plurality of cut-off glass tubes; and
    blowing opposing air into a tip end opening of the travelling continuous glass tube from downstream of the travelling continuous glass tube by use of a blower provided more downstream of the travelling continuous glass tube than the cutting blade to cause the opposing air to exit respective rear end openings of the plurality of cut-off glass tubes when cutting the travelling continuous glass tube.

9. The method for cleaning and cutting a glass tube according to claim 8, further comprising
    blowing the opposing air into tip end openings of the cut-off glass tubes from downstream of the travelling continuous glass tube after cutting the travelling continuous glass tube to cause the opposing air to exit the rear end openings of the cut-off glass tubes.

10. The method for cleaning and cutting a glass tube according to claim 8, further comprising
    stopping the cut-off glass tubes from moving further downstream of the travelling continuous glass tube by positioning a stopper more downstream of the travelling continuous glass tube than the blower such that the stopper contacts tips of the cut-off glass tubes obtained from the travelling continuous glass tube.

11. The method for cleaning and cutting a glass tube according to claim 10, wherein
    the blowing includes converging air that has been emitted from a plurality of blowing nozzles disposed opposite to each other across a virtual horizontal plane including the travelling continuous glass tube at the same pressure onto the virtual horizontal plane near a contact surface of the tips of the cut-off glass tubes in contact with the stopper.

12. The method for cleaning and cutting a glass tube according to claim 8, wherein the blowing includes intermittently blowing the opposing air.

13. The method for cleaning and cutting a glass tube according to claim 8, wherein
    the blowing includes making wind pressure of the opposing air exiting the rear end openings of the cut-off glass tubes greater than wind pressure of the air exiting the tip end opening of the travelling continuous glass tube.

* * * * *